United States Patent [19]

Voglaire

[11] Patent Number: 4,635,163

[45] Date of Patent: Jan. 6, 1987

[54] SELF-REGENERATING CAPACITOR PROTECTED BY ATHERMAL CIRCUIT-BREAKER AND A PROCESS FOR ITS MANUFACTURE

[75] Inventor: Franz Voglaire, Braine L'Alleud, Belgium

[73] Assignee: Asea Jumet Societe Anonyme, Jumet, Belgium

[21] Appl. No.: 732,037

[22] Filed: May 8, 1985

[30] Foreign Application Priority Data

May 8, 1984 [EP]  European Pat. Off. ............ 84200653
May 22, 1984 [EP] European Pat. Off. ............ 84870064
Apr. 2, 1985 [EP]  European Pat. Off. ............ 85870049

[51] Int. Cl.$^4$ ............................................. H01G 1/11
[52] U.S. Cl. .................................... 361/275; 29/25.42
[58] Field of Search ................................. 361/272-275; 29/25.42

[56] References Cited

U.S. PATENT DOCUMENTS 3,579,061  5/1971  Waldon .
4,121,277 10/1978  Hilbert ............................. 361/275 X
4,509,234  4/1985  Voglaire .......................... 361/273 X

FOREIGN PATENT DOCUMENTS 0109100  5/1984  European Pat. Off. ............ 361/275
2359431  6/1975  Fed. Rep. of Germany .
2436443  2/1976  Fed. Rep. of Germany ...... 361/275
930476  11/1947  France .
1356845  2/1964  France .
472103   4/1969  Switzerland ........................ 361/275
1447982  1/1974  United Kingdom .

OTHER PUBLICATIONS

IBM Technical Disclosure Bulletin; vol. 25; No. 8; Jan. 1983, J. J. Butera and J. E. Harris, "Overcurrent Protection for Aluminum Electrolytic Capacitors".

Primary Examiner—L. T. Hix
Assistant Examiner—Douglas S. Lee
Attorney, Agent, or Firm—Schwartz, Jeffery, Schwaab, Mack, Blumenthal & Evans

[57] ABSTRACT

In a process for the manufacture of self-regenerating capacitors, there is applied to insulating strips (3, 4) before they are rolled up, metallized layers (6, 7; 8, 9) of which the median thickness is decreased towards either side of the strips to leave a median zone of metallization (5) of normal thickness located at a specified distance from the edges of the insulating strips, and a thermal circuit-breaker (14, 19) is inserted on the axis of each coil in the vicinity of said zone of greater thickness, with the short-circuit device being coupled in series with a connection wire of each of the coils (10, 11).

17 Claims, 4 Drawing Figures

SELF-REGENERATING CAPACITOR PROTECTED BY ATHERMAL CIRCUIT-BREAKER AND A PROCESS FOR ITS MANUFACTURE

There is already in existence a process for the manufacture of self-regenerating capacitors having one or several coils in which there is applied to the strips of dielectric material a layer of metal of which the thickness at each location may be varied as a function of the distance of this location from the lateral edges of the strip, in which the metallized strips are rolled up to form at least one coil, in which the contact electrodes are applied to the lateral faces of the coil and in which the contact electrodes are coupled with the connection terminals (European Pat. No. EP-A1-109100).

The automatic regeneration of a capacitor fabricated in this manner, after a brief momentary short-circuit between opposing electrodes, is due to the evaporation of the metal of the electrodes in the region of the defect. The end of the life of such a capacitor is marked by a non-repairable short-circuit between the electrodes. If the current of the short-circuit is large, it is able to melt a fusible wire located in its circuit. In certain cases, the short-circuit may cause the capacitor to explode. Sometimes, the current of the short-circuit may be as faint as not beeing capable of melting a fusible. In this latter case, an intense heating occurs in the vicinity of the point of breakdown and leads to the slow destruction of the capacitor.

Attempts have already been made to protect against the deleterious effects of such defects by enclosing the coils of the capacitor in an hermetically-sealed casing which may be deformed as the result of internal pressure. Since the destruction of a coil of the capacitor is generally accompanied by the liberation of gas, this phenomenon has already been utilized for causing the deformation of a portion of the casing to which is attached one end of a wire which can rupture, thus allowing the capacitor to be disconnected from the circuit when the internal pressure in the casing increases (Swiss Pat. No. CH-A-472103).

Devices which are fusible at the localized ambient temperature in the vicinity of the fusible device have likewise already been utilized. These are known as thermal circuit-breakers. Such thermal circuit-breakers have been placed within vessels containing the apparatus or elements susceptible to heating which are immersed in oil. The natural convection of the oil in the vessel ensures a uniform temperature. The inventor has attempted to place such thermal circuit-breakers in the interior of the capacitor vessels in the air, in oil when the natural convection is impeded or in the non-liquid potting mass. Such arrangements have been found to be ineffectual because the circuit-breaker was generally located too far away from the site of the defect.

The objective of the present invention is to provide a self-regenerating capacitor which is effectually protected by a thermal circuit-breaker as well as a process for its manufacture.

According to the invention, the process of manufacture of a capacitor is characterized by the fact that, to the insulating strips, there are applied metallized layers of which the thickness decreases from one side to the other of a localized band at a specified distance from the edges of the strip and a thermal circuit-breaker is disposed the axis of each coil, in the vicinity of the greatest thickness of the metallic deposit, and the said thermal circuit-breaker is coupled in series with a connection wire of each coil.

By virtue of this band of metallization, the deterioration of a coil of the capacitor is localized to the vicinity of this band, because the electrical resistance of the conducting layer is very low in that position. The reasons for the end-of-life at this position are even more accentuated if this band is situated in the vicinity of the centre line of the coil where the normal-service heating is the most elevated.

In selecting the width and the placement of this band in relation to the edges of the insulating strip, it is possible to circumscribe exactly the appearance of a dangerous defect in a precise location along the axis of the coil by positioning a thermal short-circuit device in this vicinity in the axis of the coil, so that any thermal deterioration of the coil of the capacitor activates the thermal circuit-breaker immediately and uncouples the capacitor coil from the circuit, even though the current causing the deleterious heating is insufficient to melt a normal fusible wire.

The invention is described in what follows in relation to two examples of embodiment by referring to the appended drawing.

Figure 1:
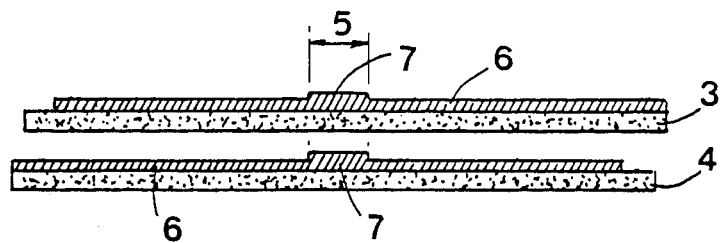
FIGS. 1 and 2 are diagrammatic cross-sections of pairs of different strips forming the coils of the capacitor.
Figure 2:
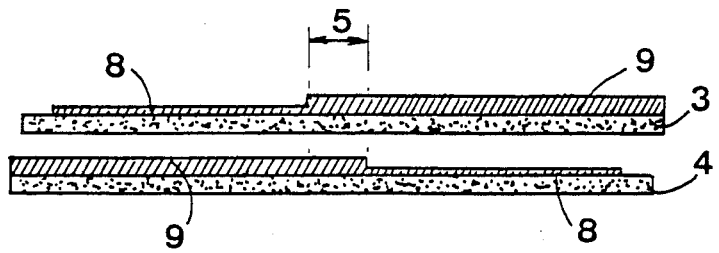

As shown in FIGS. 1 and 2, the capacitor coil 1 is formed by rolling up a pair 3, 4 of insulating strips having a metallized layer on one side. The thickness of this metallized layer is not uniform but it has a thickness which is appreciably less on either side of the median strip 5 of which the centre line is rolled up in a plane at right angles to the axis of the coil, in particular, for example, the plane of symmetry perpendicular to the axis of the coil.

According to FIG. 1, a metallized layer 6 on each of the strips 3 and 4 possesses a beading 7 in the region of the median strip 5. This arrangement is not the only one possible but it is sufficient for obtaining the desired effect of making the mean thickness, or the sum of the thicknesses of the two strips 3 and 4, greater in the region of the median strip 5. A similar result may also be obtained, for example, by metallization as shown in FIG. 2, that is to say, the metallized layer 8 is thinner on one side of the median strip 5 and the metallized layer 9 is thicker at the location of the median strip 5 and on its opposite side. The greater thickness is located, for preference, on the side where the metallization extends right across to the edge of the insulating strip to which the contact electrode, made of zinc for example, is applied by using the Schoop procedure.

It will be understood that the median strip 5 need not necessarily be rolled up exactly coinciding with the plane of symmetry of the coil, perpendicular to the axis of the coil, but it may be rolled up in a position which is displaced to one side of the said plane of symmetry. In this case, the thermal circuit-breaker would be positioned on the axis of the coil in this offset position.

Figure 3:
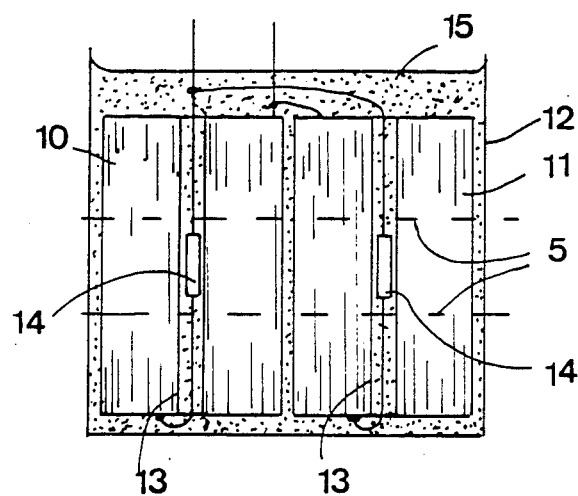
FIGS. 3 and 4 are cross-sections through capacitors in accordance with the invention.

As shown in section in FIG. 3, a capacitor consisting of two capacitor coils 10 and 11 or of two rows 10 and 11 of coils is mounted within a casing 12. The two coils are mounted in parallel. Each of these coils consists of a metallized strip of the type shown in FIGS. 1 or 2. The thickened zone of the strips is situated between the two broken lines 5. There is a thermal short-circuit device inserted into the core 13 on the axis of each capacitor coil 10 and 11. Within the core 13, the circuit-breaker may be surrounded by air, by oil, or by a hardened potting mass. In this latter case, the circuit-breaker 14 may be surrounded by a sleeve or a shell. The casing 12 may be filled with a hardened insulating potting mass 15.

The fusion temperature of the thermal short-circuit device is slightly higher than the normal operating temperature of the capacitor, for example by about 10° C. or, if the potting and the impregnation of the coils of the capacitor necessitates a temperature which is slightly higher than the operating temperature, then the fusion temperature of the device should be slightly higher again than this potting temperature. If the temperature for the treatment (potting, impregnation) of the capacitor coils is relatively high, it is advantageous for this treatment to be effected before the placement of the thermal circuit-breaker axially in the core of the coil.

In a preferred form of embodiment of the invention, only one capacitor coil is located within each separate casing.

Capacitors in accordance with the invention fabricated from the usual dielectric materials, paper, polypropylene and the like, are furnished with thermal circuit-breakers of which the fusion temperature is selected to lie within the range from 90° C. to 180° C. In this case the short-circuits are in the form of wires or relatively thick lamellae and are thus easily manipulatable in alloys fusible at these temperatures. Such alloys consist, in particular, of at least two elements from amongst the following metals: Sn, Pb, Cd, Bl and Hg. Examples of alloys with fusion temperatures between 90° C. and 180° C. are:

80% Hg, 20% Bl (90° C.);
53% Bl, 33% Pb, 14% Sn (96° C.);
54% Bl, 26% Sn, 20% Cd (103° C.);
40% Bl, 40% Pb, 20% Sn (111° C.);
50% Sn, 32% Pb, 18% Cd (145° C.);
67% Sn, 33% Pb (180° C.);
68% Sn, 32% Cd (180° C.).

The wires or lamellae forming the thermal circuit-breaker are preferably protected by a sleeve or shell suitably dimensioned to ensure certain interruption of the conductance pathway in the event of fusion. Such a sleeve is indispensible when the short-circuit device is embedded in a hardened potting mass.

Figure 4:
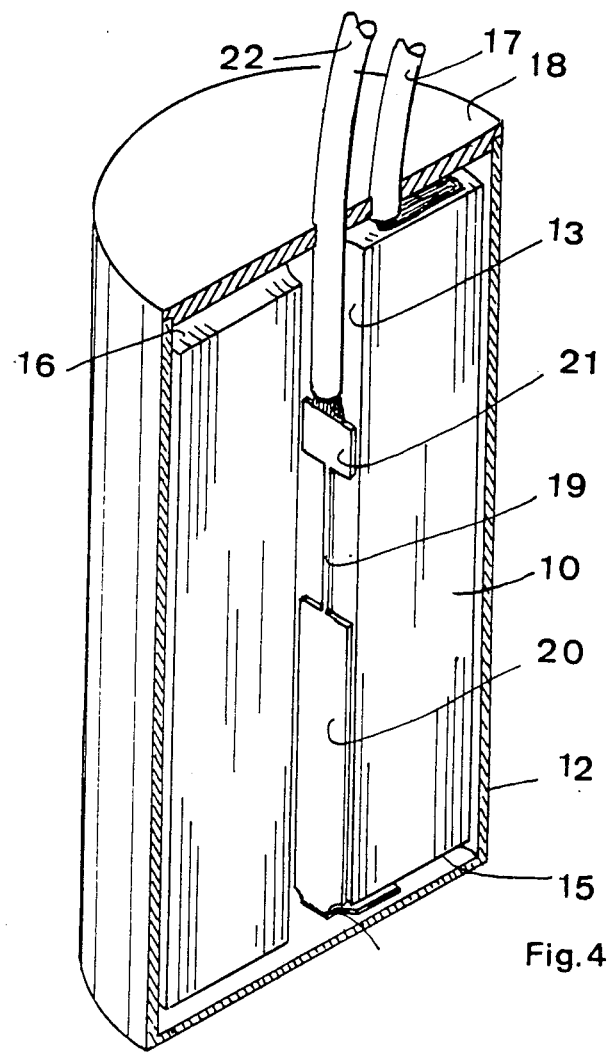

FIG. 4 shows, in perspective, a longitudinal section through a capacitor in accordance with the invention comprising a single coil 10 enclosed in a casing 12.

The capacitor coil 10 is traversed by an axial channel 13. This axial channel may be formed by the withdrawal of a mandrel around which the coil has been wound or else it may be an axial channel through a hollow insulating mandrel which forms part of the capacitor coil 10.

The end faces of the capacitor coil 10 are covered by the two electrodes 15 and 16 which may be deposited on the ends of the coil by spraying with jets of metal droplets, following the Schoop procedure. A connection wire 17 which passes through the cover 18 is soldered to the upper electrode 16.

A lamellar strip of fusible conducting metal, made of an alloy of lead and tin for example, has been stamped out in this case to have a section 19, which is greatly reduced in width to act as the fusible portion, located between the two end sections 20 and 21 having the normal width. The lower extremity of the section 20 is bent at a right angle and the whole strip is inserted into the axial channel 13 along the axis of the capacitor coil 10 until the end bent at a right angle comes into contact with the electrode 15 to which it is then soldered.

The narrow section 19 should be located in the region of the coil where the metallization of the strips is at its thickest. The end section 21 may serve directly as the means of connection or else it may be soldered to an insulated connection wire 22 as is shown in the drawing. The capacitor coil which has been prepared in this manner may be impregnated with a suitable dielectric substance, either by simply steeping in it or else by impregnation under vacuum.

After insertion of the coil in the casing 12 which is made, for preference, of an insulating material, the free spaces between the capacitor coil and the casing may be filled with an appropriate material which may be either a material which sets solid at normal temperatures for example, or else a thermo-setting resin. This filling material could form a relatively thick layer above the end of the capacitor coil with the electrode 16, thus taking the place of the end-cover 18 of the casing 12.

When a filling material such as oil does not give rise to faulty functioning of the fuse in the case of melting of this latter, there is no need to take any precautions for enclosing the section 19 of the lamellar strip. If the contrary is the case, the section 19 should be enclosed within a shell, not depicted, to prevent the filling material from coming into contact with the metal of the section 19.

I claim:
1. A self-regenerating capacitor comprising:
   a plurality of insulating strips having lateral edges;
   a plurality of metallized strips mounted on said insulating strips, said metallized strips having plural zones, the thickness in each zone being varied as a function of the distance of each zone from said lateral edges of said insulating strips, wherein said insulating and metallized strips are rolled to form a coil having first and second end faces, and wherein a mean thickness of said metallized strips decreases toward said lateral edges to leave a median zone of metallization of normal thickness located at a predetermined distance from said lateral edges of said insulating strips;
   contact electrodes applied to said first and second end faces of said coil; and
   a thermal circuit breaker disposed along an axis of said coil positioned at said predetermined distance, said thermal circuit breaker being electrically connected to said contact electrodes.

2. Capacitor fabricated by the process according to claim 1, further comprising a casing means for housing said coils.

3. The capacitor according to claim 1, wherein there is one capacitor coil enclosed within each casing.

4. The capacitor according to claim 1, wherein each casing contains several capacitor coils mounted in parallel.

5. The capacitor according to claim 1, wherein the thermal circuit-breaker is a strip comprised of an alloy containing at least two elements selected from the group of: Bl, Cd, Hg, Pb, Sn.

6. The capacitor according to claim 1, wherein the thermal circuit-breaker is a strip having a constricted section.

7. The capacitor according to claim 1, wherein said insulating layers are comprised of dielectric material.

8. The capacitor according to claim 1, further comprising a connection terminal for establishing said electrical connection between said contact electrodes and said thermal circuit breaker.

9. The capacitor according to claim 1, wherein said zone of metallization is offset from a central axis of said coil.

10. The capacitor of claim 7, wherein said constricted section is positioned adjacent to a thickest portion of said zone of metallization.

11. A method of manufacturing a self-regenerating capacitor comprising the steps of:
 (a) providing a pair of insulating strips;
 (b) mounting a metallized layer on each of said insulating strips;
 (c) forming a zone of increased thickness at a predetermined point along each metallized layer;
 (d) stacking said strips on top of each other such that said zones of increased thickness are aligned;
 (e) rolling said stacked strips in order to form a coil having an axis of increased metal thickness;
 (f) providing contact electrodes at first and second ends of said coil; and
 (g) providing a thermal circuit breaker along an axis near said axis of increased metal thickness.

12. The method of claim 11, wherein said axis of increased metal thickness is offset from a central axis of said coil.

13. The method of claim 11, further comprising the steps of:
 (a) repeating the method to form a second coil; and
 (b) mounting said first and second coils in parallel inside a casing.

14. The method of claim 11, further comprising the steps of:
 (a) mounting said coil inside a casing; and
 (b) filling said casing with a hardened insulating potting mass.

15. The method of claim 11, further comprising the step of providing a protective shell means around said thermal circuit breaker for insuring interruption of a conductance path upon the occurrence of fusion.

16. The method of claim 11, further comprising the step of:
 (a) forming an axial channel through said coil; and
 wherein the step of providing a thermal circuit breaker comprises providing a thermal circuit breaker having a constricted section inside said axial channel.

17. The method of claim 16, wherein said step of providing comprises positioning said constricted section adjacent to a thickest portion of said axis of increased metal thickness.

* * * * *